(12) United States Patent
Chen et al.

(10) Patent No.: US 7,190,128 B2
(45) Date of Patent: Mar. 13, 2007

(54) MULTI-PHASE MULTI-LAMP DRIVING SYSTEM

(76) Inventors: Chien-Chih Chen, No. 406, Tan-Ting Tsun, Hsin-Shih Hsiang, Tainan Hsien (TW); Tsai-Fu Wu, No. 24-7, Hu-Wei Liao, Chen-Pei Tsun, Min-Hsiung Hsiang, Chia-Yi Hsien (TW); Yu-Tien Chuang, No. 45, Chng-Chou 2nd Rd., Chi-Chun Dist., Kaohsiung City (TW)

( * ) Notice: Subject to any disclaimer, the term of this patent is extended or adjusted under 35 U.S.C. 154(b) by 0 days.

(21) Appl. No.: 10/960,060

(22) Filed: Oct. 8, 2004

(65) Prior Publication Data

US 2006/0076907 A1    Apr. 13, 2006

(51) Int. Cl.
 *H05B 41/16* (2006.01)
(52) U.S. Cl. .................................... 315/312
(58) Field of Classification Search ............... 315/307, 315/310, 312, 324–325, 224, 291, 194–196, 315/DIG. 5, 276–277, 279, 281, 282
See application file for complete search history.

(56) References Cited

U.S. PATENT DOCUMENTS

| | | | |
|---|---|---|---|
| 6,534,934 B1 * | 3/2003 | Lin et al. | 315/312 |
| 6,717,372 B2 * | 4/2004 | Lin et al. | 315/282 |
| 6,781,325 B2 * | 8/2004 | Lee | 315/282 |
| 6,784,627 B2 * | 8/2004 | Suzuki et al. | 315/291 |
| 6,949,890 B2 * | 9/2005 | Chou et al. | 315/294 |
| 7,002,304 B2 * | 2/2006 | Chan et al. | 315/282 |
| 2003/0001524 A1* | 1/2003 | Lin et al. | 315/312 |
| 2005/0146286 A1* | 7/2005 | Chan et al. | 315/276 |
| 2005/0225514 A1* | 10/2005 | Ahn et al. | 345/75.2 |

OTHER PUBLICATIONS

Chen, et al. Multi-Phase Multi-Lamp Driving System for LCD Back Light, *2004 35th Annual IEEE Power Electronics Specialists Conference*. Aachen, Germany, 2004.

* cited by examiner

*Primary Examiner*—Shih-Chao Chen
*Assistant Examiner*—Minh Dieu A
(74) *Attorney, Agent, or Firm*—Pearl Cohen Zedek Latzer, LLP

(57) ABSTRACT

A multi-lamp driving system for driving lamp units includes a multi-phase alternating current (AC) power generating unit for generating a plurality of out-of-phase AC current signals, and a balancing unit for balancing current flowing through each lamp unit. The balancing unit includes a plurality of loads, and a multi-phase transformer that has a plurality of coils. Each lamp unit is adapted to be connected to at least one of a respective load and a respective coil, and forms a series connection with the respective load and the respective coil. The series connection of each lamp unit with the respective load and the respective coil is coupled across the AC power generating unit.

11 Claims, 16 Drawing Sheets

FIRIST PHASE: $V_0 \angle 0° = (i_1 + i_{Z1} - i_{Z3})Z_C + i_1 Z_{R1}$
SECOND PHASE: $V_0 \angle 120° = (i_2 + i_{Z2} - i_{Z1})Z_C + i_2 Z_{R2}$
THIRD PHASE: $V_0 \angle 240° = (i_3 + i_{Z3} - i_{Z2})Z_C + i_3 Z_{R3}$

MULTI-PHASE MULTI-LAMP DRIVING SYSTEM

BACKGROUND OF THE INVENTION

1. Field of the Invention

The invention relates to a lamp driving system, more particularly to a multi-phase multi-lamp driving system.

2. Description of the Related Art

Lamps used in scanners, copy machines or liquid crystal displays serve as a backlight source. In order to enhance and obtain a uniform brightness, an increased number of lamps are needed. A lamp driving system is usually used to ensure that a current flowing through each lamp is identical such that the service life of each lamp can be extended.

Referring to FIGS. 1 and 2, conventional multi-lamp driving systems, such as that disclosed in U.S. Pat. No. 6,534,934, are known in the art. However, in the conventional multi-lamp system of FIG. 1, when the impedance of a capacitor (C1) and a lamp 91 connected in series does not match the impedance of another capacitor (C2) and a lamp 91 connected in series, the currents flowing through the lamps 91, 92 are different from each other such that a uniform brightness of the lamps 91, 92 cannot be ensured. Furthermore, the one of the two lamps 91, 92 supplied with the larger current has a decreased service life. In the conventional multi-lamp system of FIG. 2, the impedances of the loads (Za, Zb, Zc) can be adjusted such that the currents flowing through the lamps 91, 92 are identical. However, the conventional multi-lamp driving system of FIG. 2 is only suitable for two lamps.

FIG. 3 illustrates another multi-lamp driving system for driving a plurality of lamps 91, 92, 93, 94 (more than two lamps). The system is formed by connecting in parallel a number (i.e., two) of the conventional multi-lamp driving systems of FIG. 2. However, as shown in FIG. 4, a current ripple ($I_{r1}$) flowing through the inverter 81 and a current ripple ($I_{r2}$) flowing through the inverter 82 have the same amplitude and the same phase such that a total current ripple ($I_M$), which results from the constructive interference of the current ripples ($I_{r1}$, $I_{r2}$), generated by the conventional multi-lamp driving system of FIG. 3 is increased. Electromagnetic interference occurs as a consequence.

SUMMARY OF THE INVENTION

Therefore, the object of the present invention is to provide a multi-lamp driving system that can effectively minimize a total current ripple generated thereby.

According to the present invention, there is provided a multi-lamp driving system for driving a plurality of lamp units. The multi-lamp driving system comprises:

a multi-phase alternating current (AC) power generating unit for generating a plurality of out-of-phase AC current signals; and a balancing unit for balancing current flowing through each of the lamp units, the balancing unit including a plurality of loads, and a multi-phase transformer that has a plurality of coils, each of the lamp units being adapted to be connected to at least one of a respective one of the loads and a respective one of the coils, and forming a series connection with the respective one of the loads and the respective one of the coils.

The series connection of each of the lamp units with the respective one of the loads and the respective one of the coils is coupled across the AC power generating unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
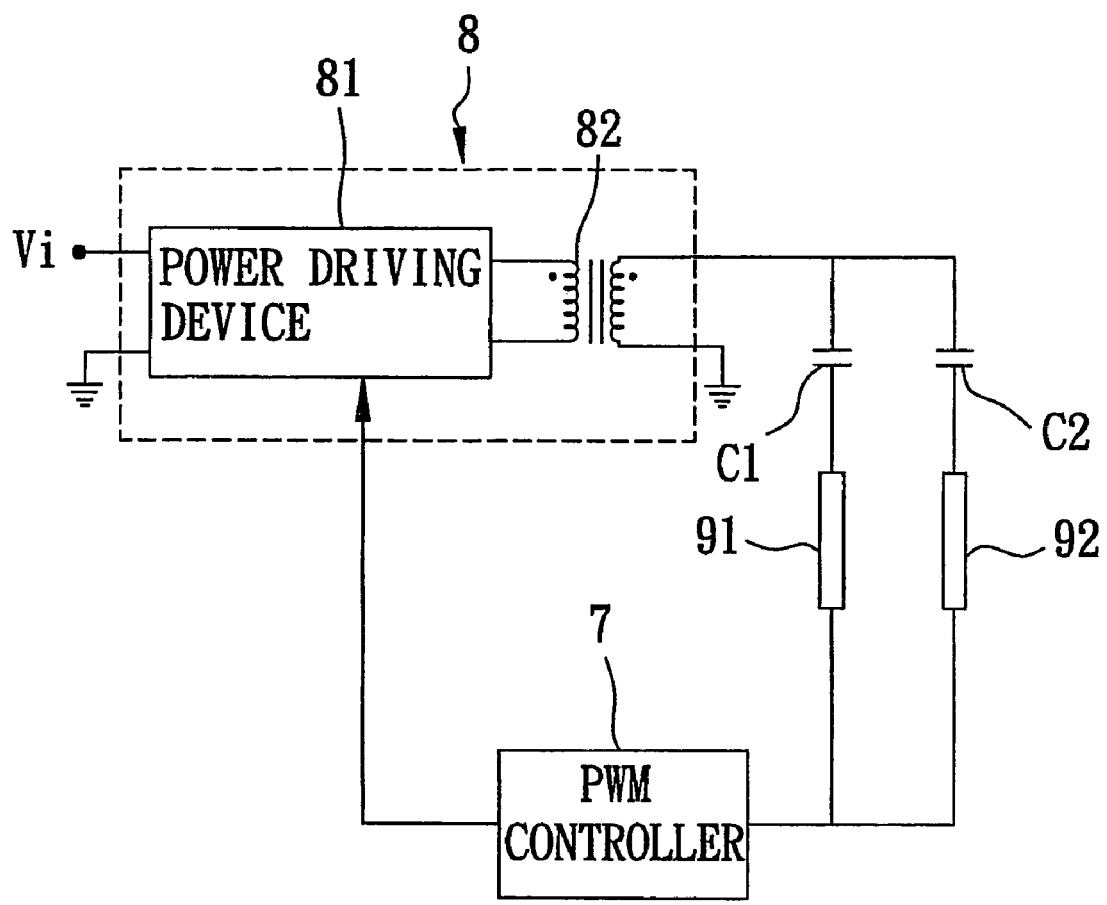
FIG. 1 is a diagram showing the configuration of a conventional multi-lamp driving system.
Figure 2:
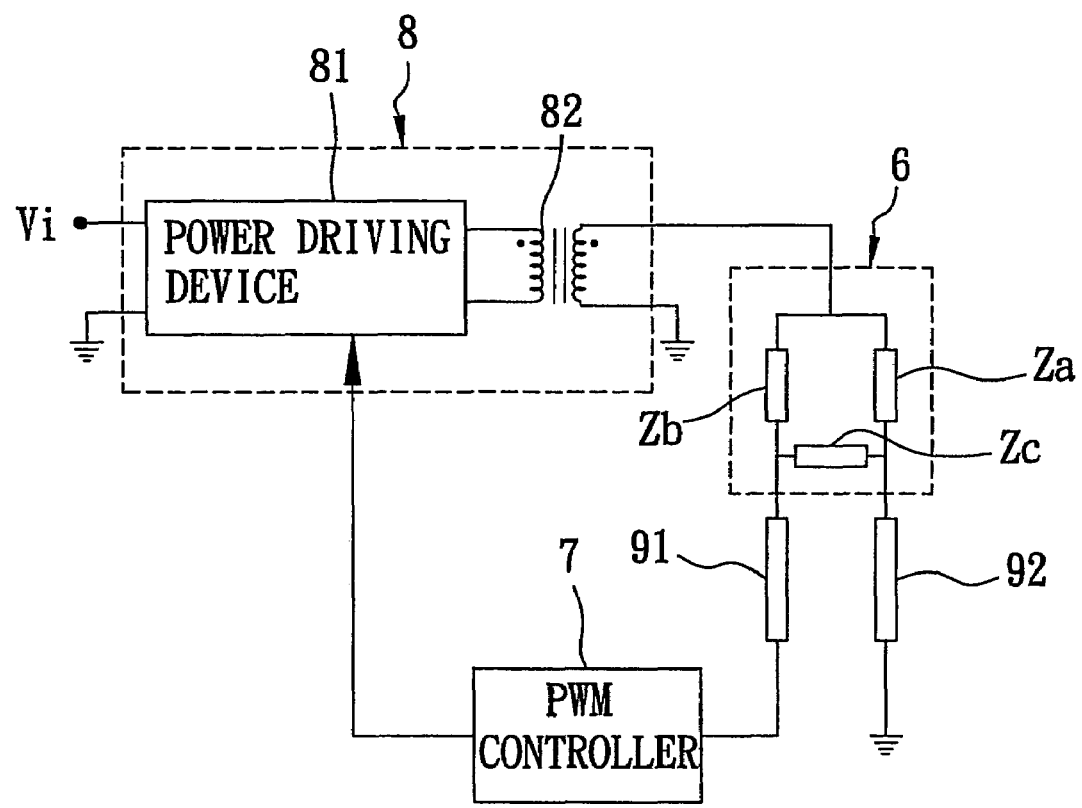
FIG. 2 is a diagram showing the configuration of another conventional multi-lamp driving system.
Figure 3:
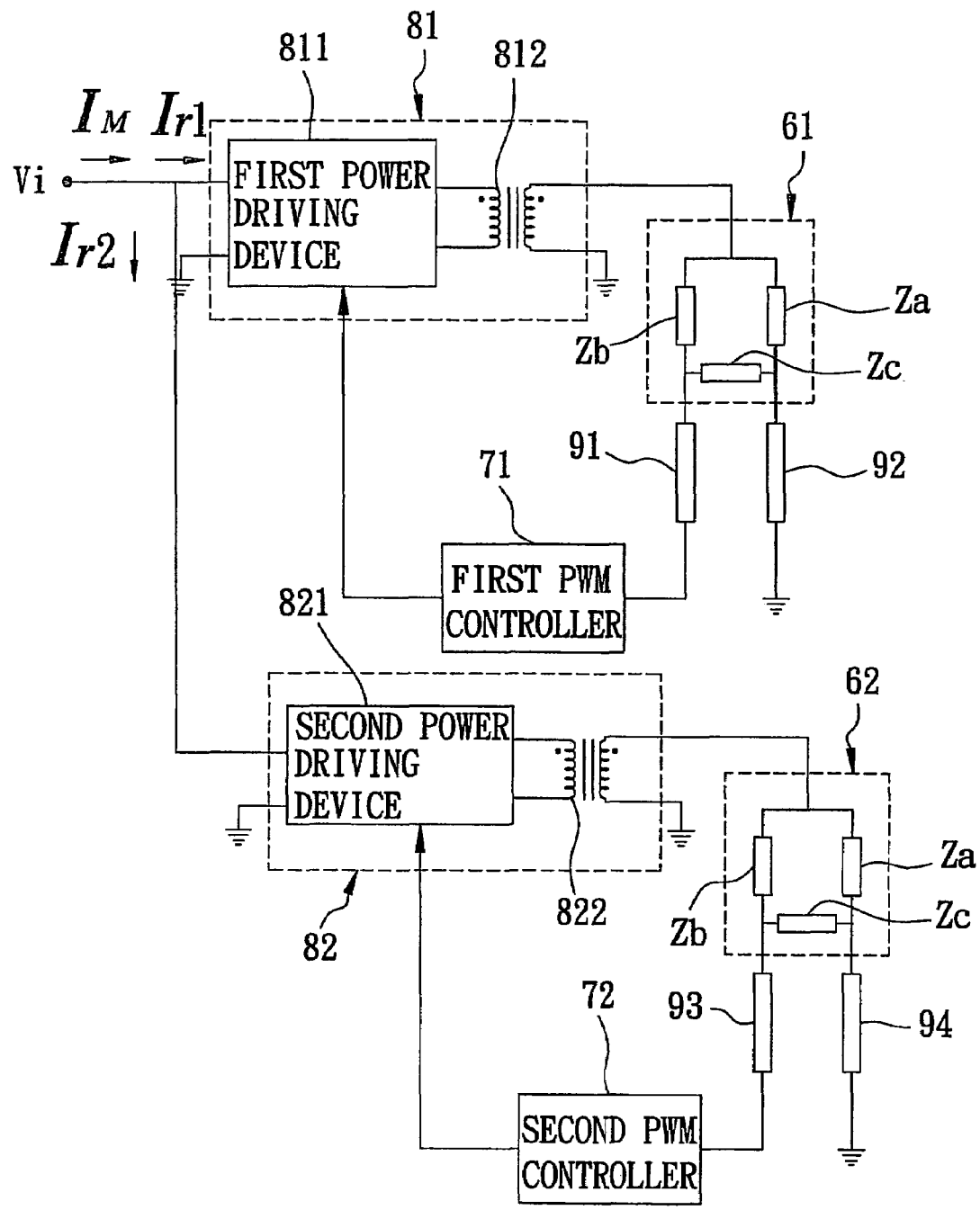
FIG. 3 is a diagram showing the configuration of a further conventional multi-lamp driving system.
Figure 4:
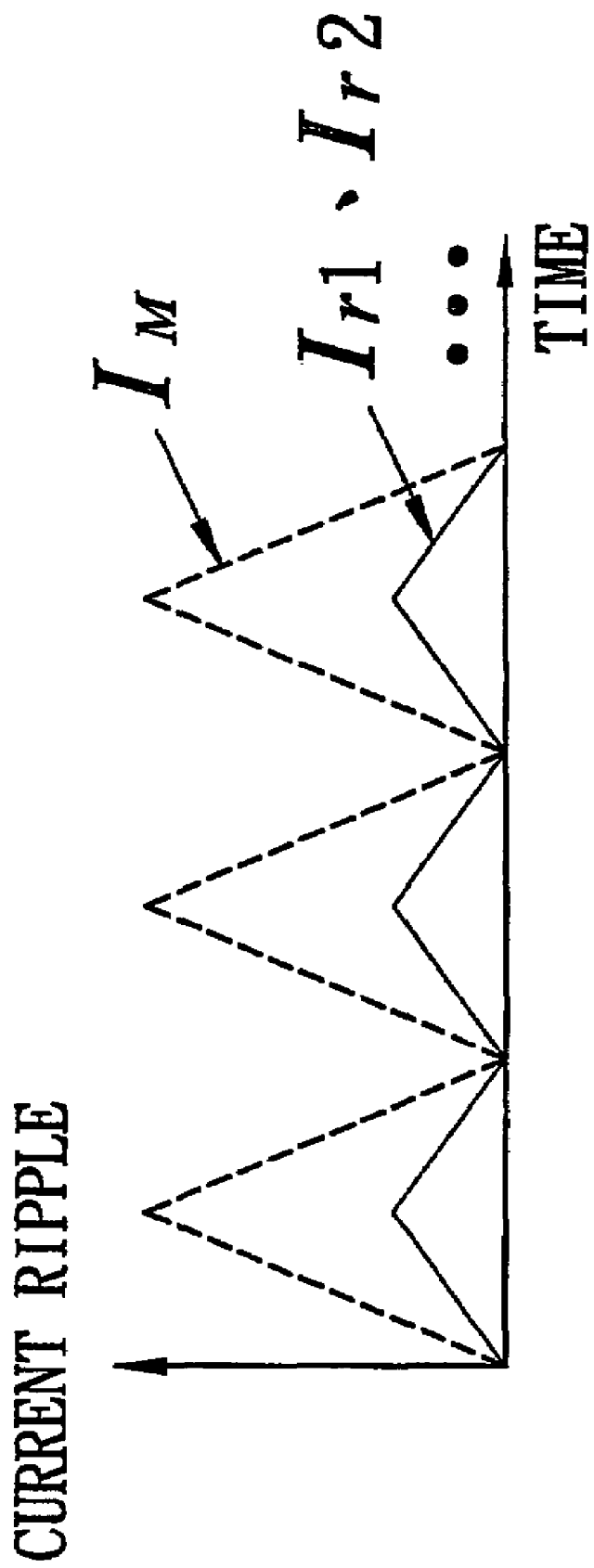
FIG. 4 is a graph showing current ripples generated in the conventional multi-lamp driving system of FIG. 3.

Before the present invention is described in greater detail, it should be noted that like elements are denoted by the same reference numerals throughout the disclosure.

Figure 5:
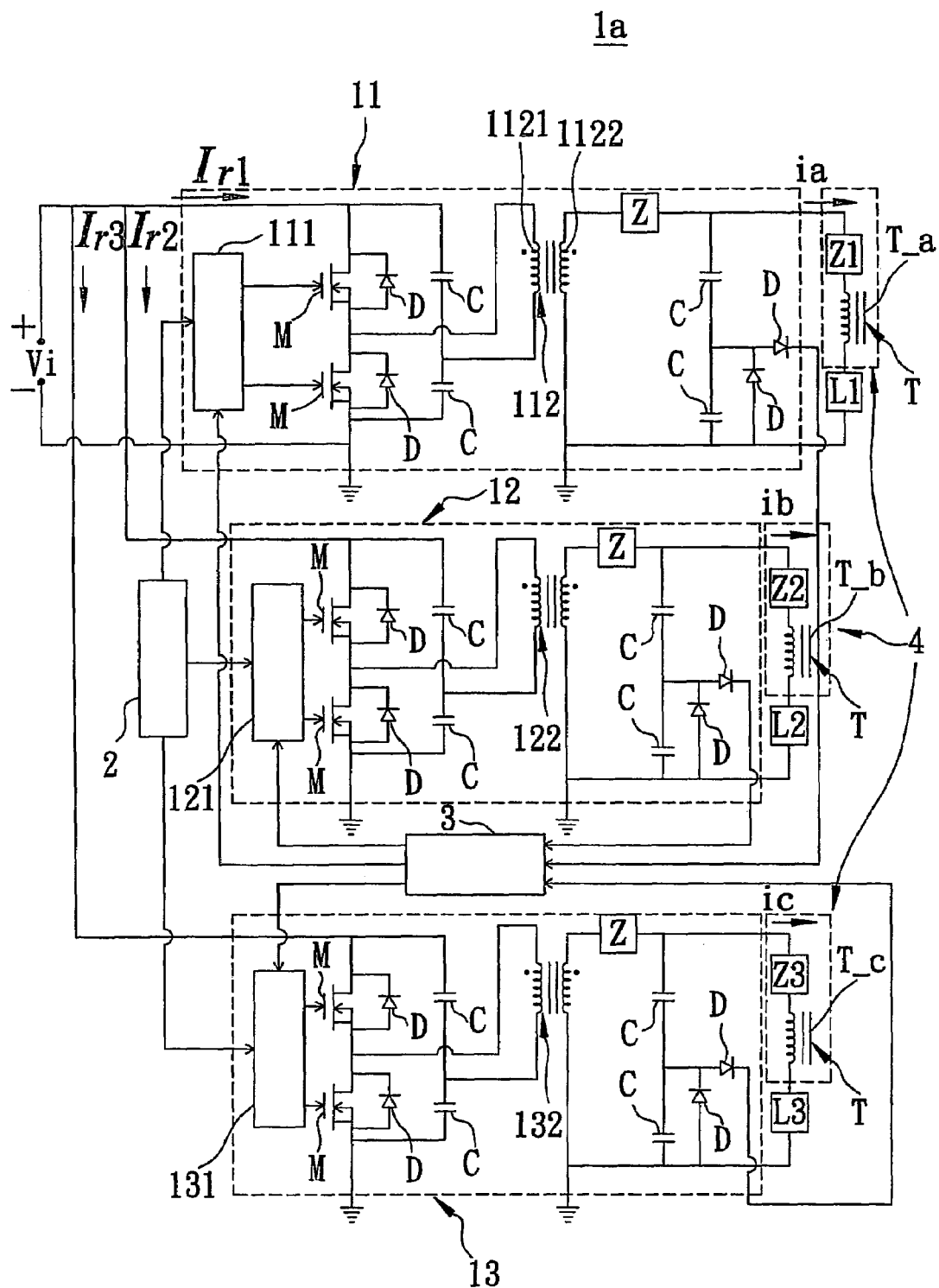
FIG. 5 is a schematic electrical circuit diagram illustrating the first preferred embodiment of a multi-lamp driving system according to the present invention.

Referring to FIG. 5, the first preferred embodiment of a multi-lamp driving system (1a) for driving first, second and third lamp units (L1, L2, L3) according to the present invention is shown to include a multi-phase alternating current (AC) power generating unit, and a balancing unit 4. In this embodiment, each of the first, second and third lamp units (L1, L2, L3) includes a single cold cathode fluorescent lamp (CCFL).

The balancing unit 4 generates a plurality of out-of phase AC current signals ($i_a$, $i_b$, $i_c$) In this embodiment, the balancing unit 4 includes first, second and third loads (Z1, Z2, Z3), each of which can also be composed of at least one of resistors, capacitors, inductors, transistors and integrated circuits, and a multi-phase transformer (T) that has three coils (T_a, T_b, T_c). In this embodiment, each of the coils (T_a, T_b, T_c) is connected in series to a respective one of the first, second and third loads (Z1, Z2, Z3), and is adapted to be connected in series to a respective one of the first, second and third lamp loads (L1, L2, L3) With this configuration, therefore, each of the first, second and third lamp units (L1, L2, L3) forms a series connection with a respective one of the first, second and third loads (Z1, Z2, Z3) and a respective one of the coils (T_a, T_b, T_c).

The AC power generating unit balances current flowing through each of the first, second and third lamp units (L1, L2, L3). In this embodiment, the AC power generating unit includes first, second and third inverters 11, 12, 13, a phase shift controller 2 and a controller 3. Each of the first, second and third inverters 11, 12, 13 is operable to convert an external direct-current (DC) signal (Vi) into the AC current signals ($i_a$, $i_b$, $i_c$), respectively.

Figure 6:
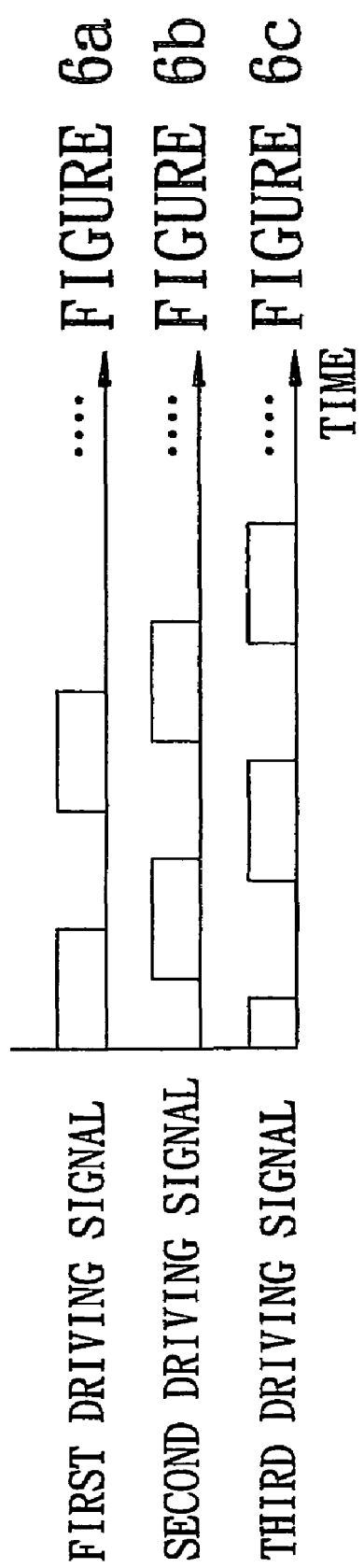
FIG. 6a to 6c are graphs showing first to third driving signals generated by a phase shift controller of the first preferred embodiment.

The phase shift controller 2 is connected electrically to the first, second and third inverters 11, 12, 13 for generating first, second and third driving signals. In this embodiment, a phase difference between any two of the driving signals is an integer multiple of 120°, that is, an integer multiple of 360°/(number of driving signal), as shown in FIGS. 6a, 6b and 6c. Therefore, each of the first, second and third inverters 11, 12, 13 outputs the respective one of the AC current signals ($i_a$, $i_b$, $i_c$) in response to a respective one of the first, second and third driving signals generated by the phase shift controller 2.

The controller 3, which is a low frequency pulse width modulation (PWM) controller in this embodiment, is connected electrically to each of the first, second and third inverters 11, 12, 13 for generating a feedback PWM signal thereto so as to control the brightness of each of the first, second and third lamp units (L1, L2, L3).

Regarding the detailed operation for each of the first, second and third driving circuits 111, 121, 131, reference may be made to the disclosure in "Simplified Control Technique LCD Backlight Inverter System Using the Mixed Dimming Method" proposed by S. W. Lee, in Applied Power Electronics Conference and Exposition, Sixteenth Annual IEEE, Vol. 1, pp. 447–453, 2001.

Figure 7:
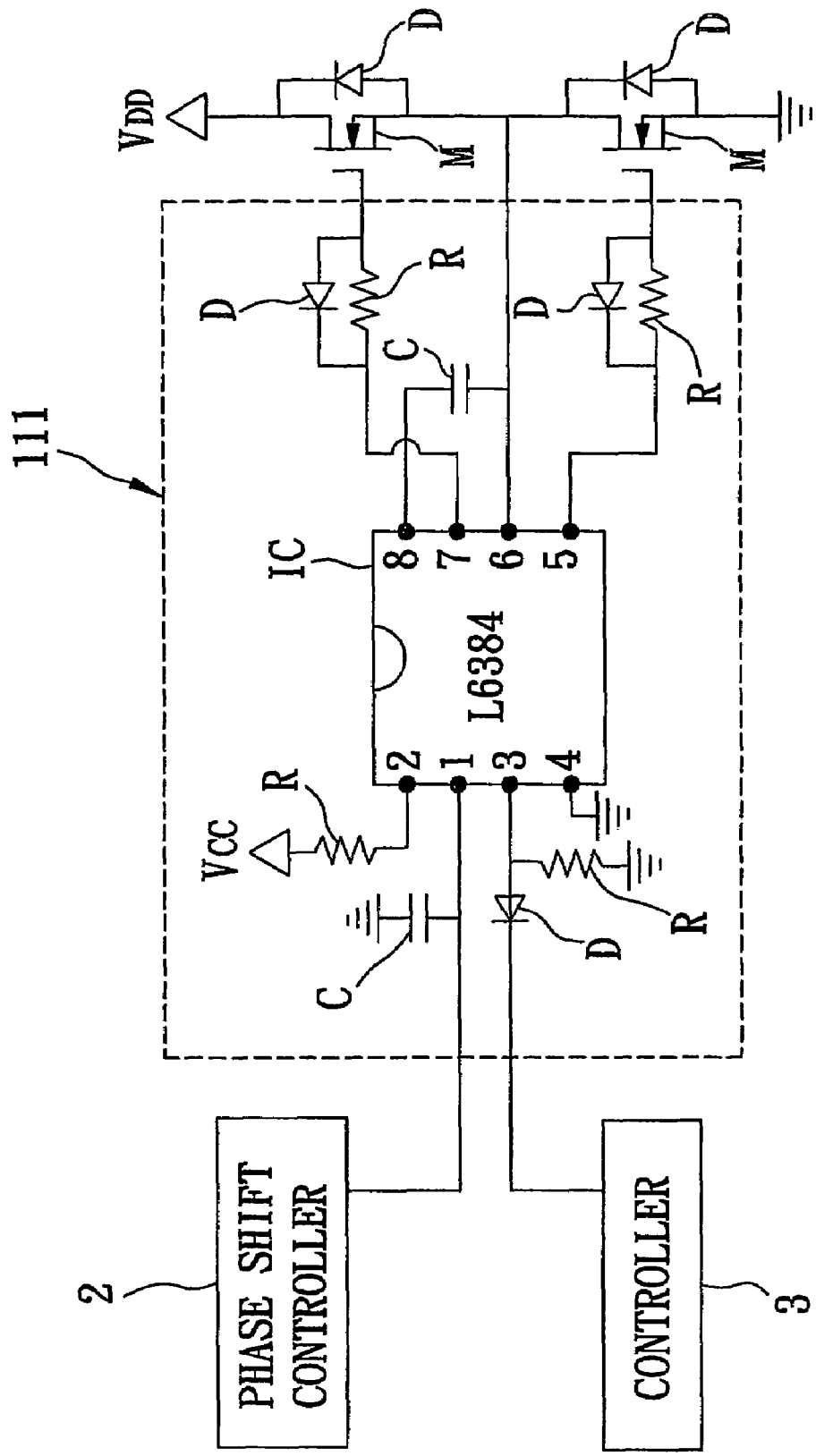
FIG. 7 is a schematic electrical circuit diagram illustrating a first driving circuit of the first preferred embodiment.

In this embodiment, the first inverter 11 includes the first driving circuit 111 and a single-phase transformer 112. As shown in FIG. 7, the first driving circuit 111, which is composed of an L6384 integrated circuit (IC), capacitors (C), diodes (D), and resistors (R) in this embodiment, is connected electrically to the phase shift controller 2 and the controller 3 for receiving the first driving signal and the respective feedback PWM signal therefrom so as to alternately turn on switching elements (M) to convert the DC signal (Vi) into the AC current signal ($i_a$) The single-phase transformer 112 is used for adjusting the AC current signal ($i_a$), and has a primary coil 1121, and a secondary coil 1122 coupled to the series connection of the lamp unit (L1) with the load (Z1) and the coil (T_a). Each of the second and third driving circuits 121, 131 has the same configuration as the first driving circuit 111. It should be noted that the second driving circuit 121 receives the second driving signal from the phase shift controller 2 and the respective feedback PWM signal from the controller 3 for converting the DC signal (Vi) into the AC current signal ($i_b$), and that the third driving circuit 131 receives the third driving signal from the phase shift controller 2 and the respective feedback PWM signal from the controller 3 for converting the DC signal (Vi) into the AC current signal ($i_c$).

Figure 8:
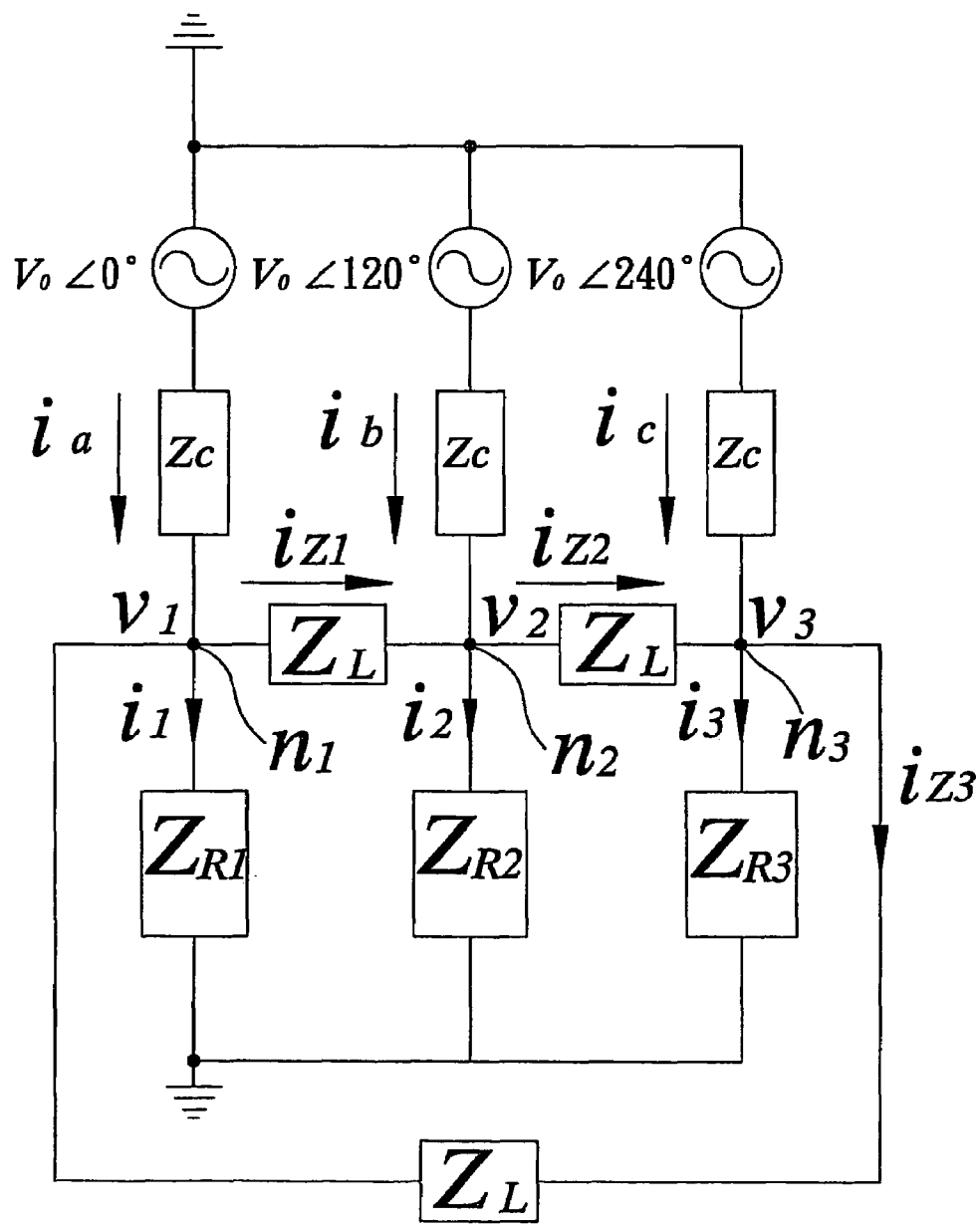
FIG. 8 is a schematic equivalent circuit diagram illustrating the operations of a balancing unit of FIG. 4.

FIG. 8 is a schematic equivalent circuit diagram illustrating the operations of the balancing unit 4. In FIG. 8, $Z_L$ represents an equivalent impedance of each of the coils (T_a, T_b, T_c), $Z_C$ represents an impedance of each of the first, second and third loads (Z1, Z2, Z3), and $Z_{R1}$, $Z_{R2}$ and $Z_{R3}$ represent respectively equivalent impedances of the first, second and third lamp units (L1, L2, L3). Further, $i_a$, $i_b$ and $i_c$ represent respectively currents flowing through the first, second and third loads (Z1, Z2, Z3), $i_1$, $i_2$ and $i_3$ represent respectively currents flowing through the first, second and third lamp units (L1, L2, L3), and $i_{Z1}$, $i_{Z2}$ and $i_{Z3}$ represent respectively currents flowing through the coils (T_a, T_b, T_c) (i.e., $i_{Z1}$, $i_{Z2}$ and $i_{Z3}$ are imbalance currents within the first, second and third inverters 11, 12, 13). $v_1$, $v_2$ and $v_3$ represent respectively potentials of three nodes (n1, n2, n3).

The following current relationship expressed as Equations (1)–(3) can be found in FIG. 8:

$$i_a = i_1 + i_{Z1} - i_{Z3} \qquad \text{Equation (1)}$$

$$i_b = i_2 + i_{Z2} - i_{Z1} \qquad \text{Equation (2)}$$

$$i_c = i_3 + i_{Z3} - i_{Z2} \qquad \text{Equation (3)}$$

Performing analysis using Kirchhoff's Laws and Ohm's Law, we can obtain the following:

$$i_{Z1} = (v_1 - v_2)/Z_L = (i_1 Z_{R1} - i_2 Z_{R2})/Z_L \qquad \text{Equation (4)}$$

$$i_{Z2} = (v_2 - v_3)/Z_L = (i_2 Z_{R2} - i_3 Z_{R3})/Z_L \qquad \text{Equation (5)}$$

$$i_{Z3} = (v_3 - v_1)/Z_L = (i_3 Z_{R3} - i_1 Z_{R1})/Z_L \qquad \text{Equation (6)}$$

By utilizing Equations (1)–(3), $V_0 \angle 0°$, $V_0 \angle 120°$ and $V_0 \angle 240°$ can be obtained as follows:

$$V_0 \angle 0° = (i_1 + i_{Z1} - i_{Z3}) Z_C + i_1 Z_{R1} \qquad \text{Equation (7)}$$

$$V_0 \angle 120° = (i_2 + i_{Z2} - i_{Z1}) Z_C + i_2 Z_{R2} \qquad \text{Equation (8)}$$

$$V_0 \angle 240° = (i_3 + i_{Z3} - i_{Z2}) Z_C + i_3 Z_{R3} \qquad \text{Equation (9)}$$

By introducing respectively Equations (4)–(6) into Equations (7)–(9), we can find that $i_1$, $i_2$ and $i_3$ are the same when $|Z_C/Z_L| \approx 1/3$ or $1/(\omega_s^2 LC) \approx 1/3$.

Therefore, $Z_C$ and $Z_L$ can be adjusted to make $i_1$, $i_2$ and $i_3$ identical, ultimately enabling the service life of the lamp units (L1, L2, L3) to be extended.

In the first preferred embodiment, we can obtain the following simulation result: in the case where transformers 112, 122, 132 output respectively $V_0 \angle 0°$, $V_0 \angle 120°$ and $V_0 \angle 240°$ ($V_0 = 1000$ volts), $Z_C$ (the impedance of each of the loads (Z1, Z2, Z3)) is $-100$ kjΩ, $Z_L$ (the equivalent impedance of each of the coils (T_a, T_b, T_c)) is 300 kjΩ, and $Z_{R1}$, $Z_{R2}$ and $Z_{R3}$ (the equivalent impedances of the lamp units (L1, L2, L3)) are 100 kΩ, 100 kΩ and 110 kΩ, respectively, $i_1$, $i_2$ and $i_3$ have the same amplitude of 10 mA and phase angles of 90°, −150° and −30°.

Figure 9:
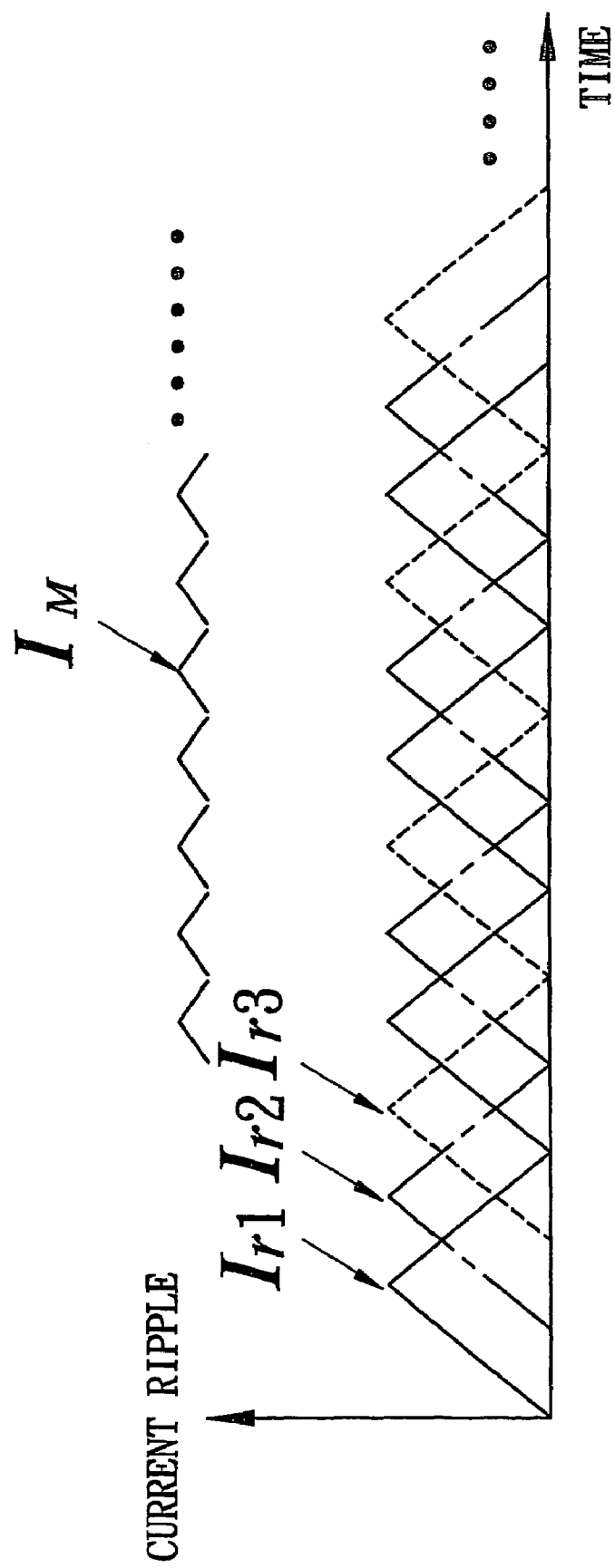
FIG. 9 is a graph showing current ripples generated in the first preferred embodiment.

Referring again to FIG. 5, $I_{r1}$, $I_{r2}$ and $I_{r3}$ represent current ripples flowing through the first, second and third inverters 11, 12, 13, respectively. Referring to FIG. 9, $I_M$ represents a total current ripple generated by the multi-lamp driving system (1a), and is the sum of $I_{r1}$, $I_{r2}$ and $I_{r3}$. Since $I_{r1}$, $I_{r2}$ and $I_{r3}$ have different phases, the total current ripple ($I_M$) can be minimized.

Figure 10:
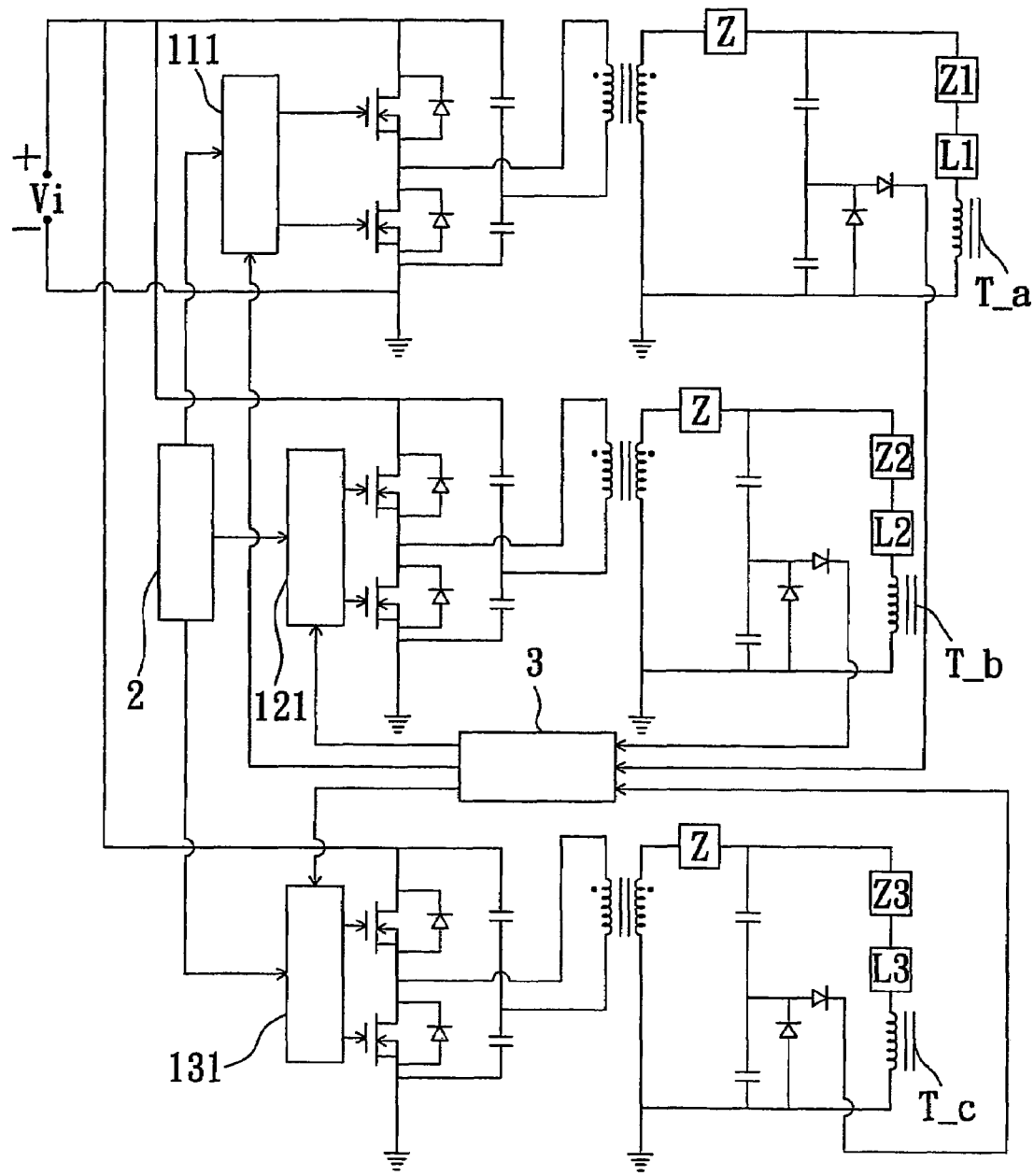
FIG. 10 is a schematic electrical circuit diagram illustrating the second preferred embodiment of a multi-lamp driving system according to the present invention.

FIG. 10 illustrates the second preferred embodiment of a multi-lamp driving system (1b) for driving first, second and third lamp units (L1, L2, L3) according to the present invention, which is a modification of the first preferred embodiment. Unlike the previous embodiment of FIG. 5, each of the first, second and third lamp units (L1, L2, L3) is adapted to be connected between the respective one of the first, second and third loads (Z1, Z2, Z3) and the respective one of the coils (T_a, T_b, T_c).

Figure 11:
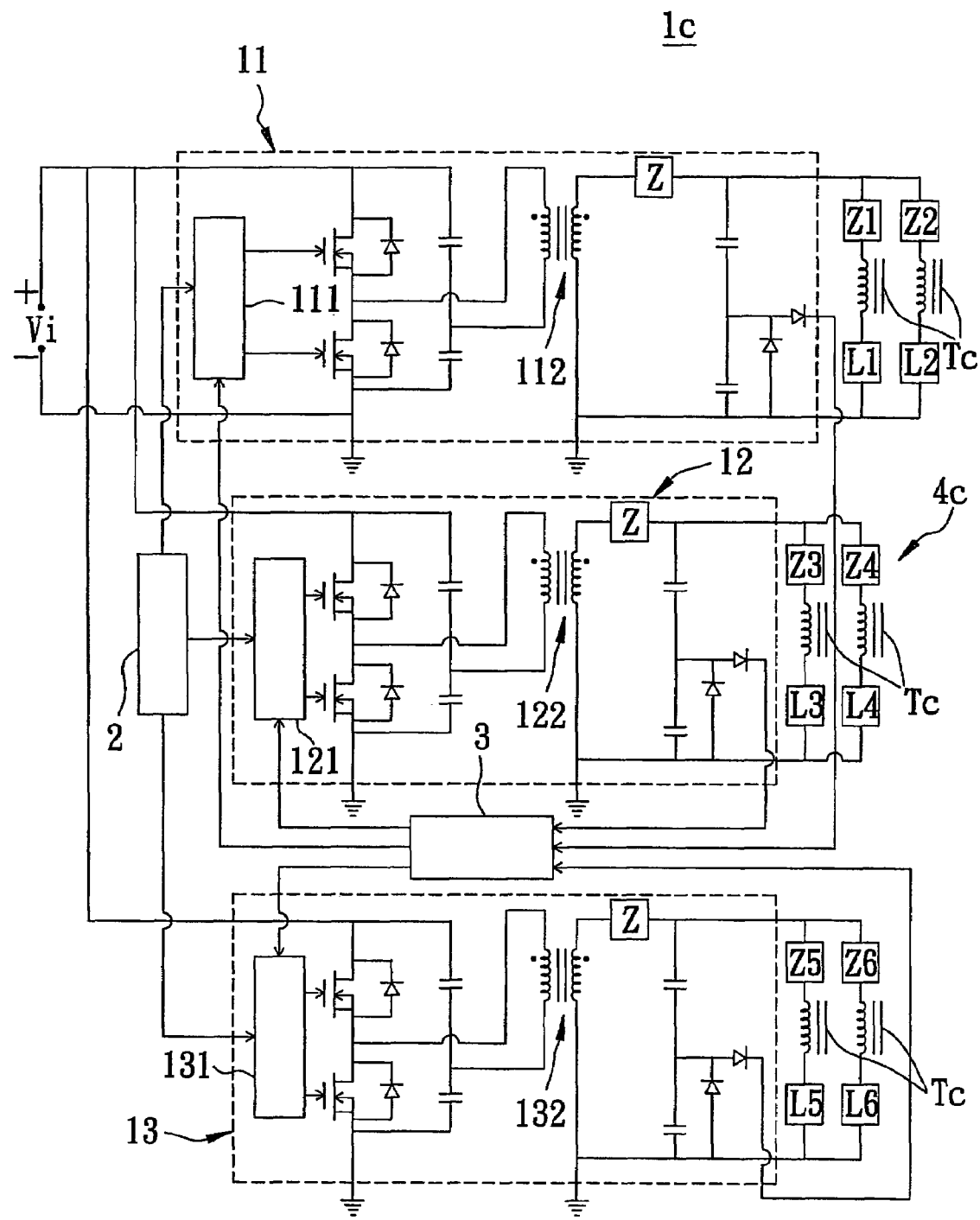
FIG. 11 is a schematic electrical circuit diagram illustrating the third preferred embodiment of a multi-lamp driving system according to the present invention.

FIG. 11 illustrates the third preferred embodiment of a multi-lamp driving system (1c) for driving a plurality of lamp units (L1–L6) according to the present invention, which is a modification of the first preferred embodiment. Unlike the first preferred embodiment of FIG. 5, a multi-phase transformer (Tc) of a balancing unit (4c) has six coils. The series connection of the lamp unit (L1) with a load (Z1) and a respective coil of the transformer (Tc), and the series connection of the lamp (L2) with a load (Z2) and a respective coil of the transformer (Tc) are connected in parallel and across the first inverter 11. Similarly, the series connection of the lamp unit (L3) with a load (Z3) and a respective coil of the transformer (Tc), and the series connection of the lamp (L4) with a load (Z4) and a respective coil of the transformer (Tc) are connected in parallel and across the second inverter 12. The series connection of the lamp unit (L5) with a load (Z5) and a respective coil of the transformer (Tc), and the series connection of the lamp (L6) with a load (Z6) and a respective coil of the transformer (Tc) are connected in parallel and across the third inverter 13.

Figure 12:
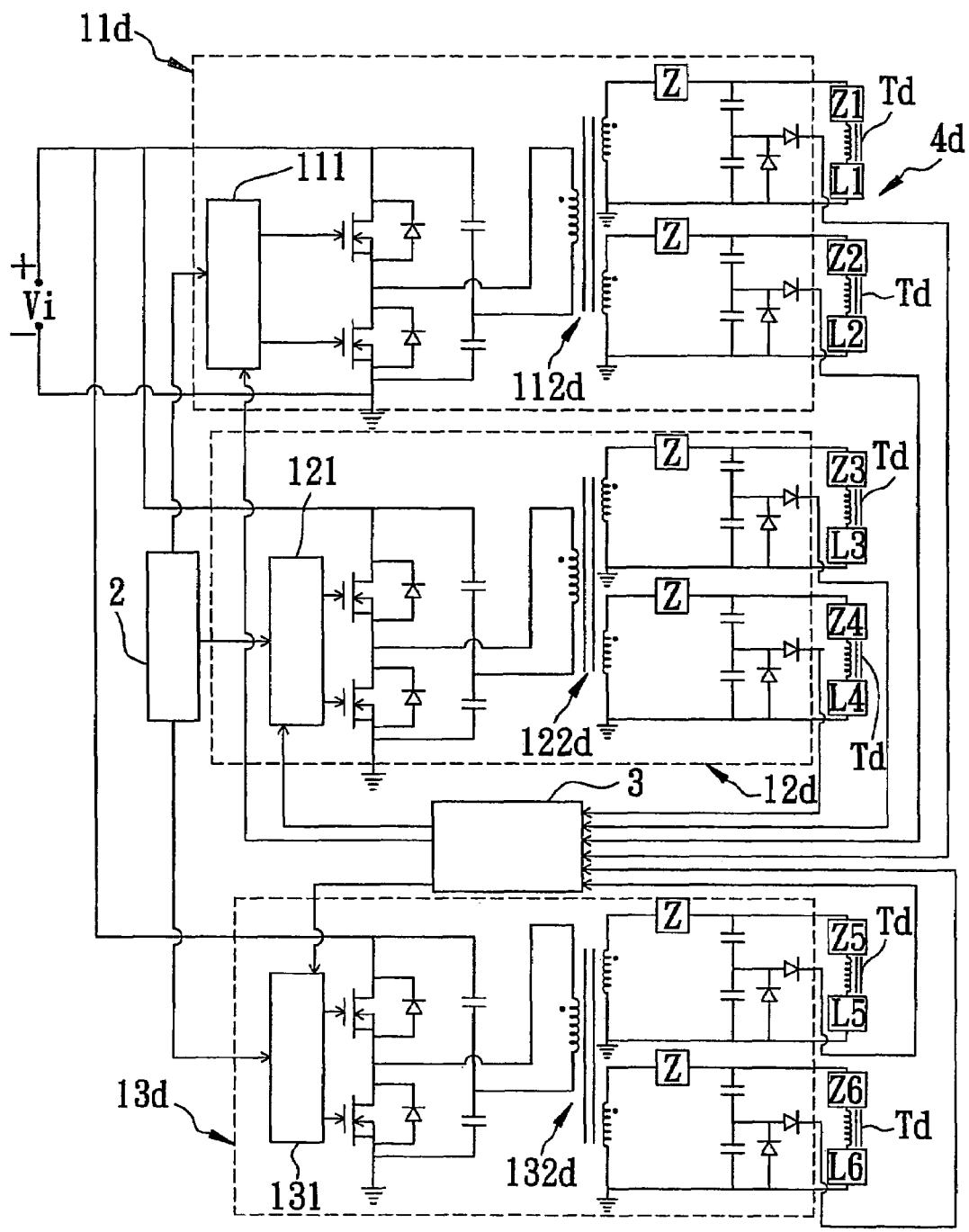
FIG. 12 is a schematic electrical circuit diagram illustrating the fourth preferred embodiment of a multi-lamp driving system according to the present invention.

FIG. 12 illustrates the fourth preferred embodiment of a multi-lamp driving system (1d) for driving a plurality of lamp units (L1–L6) according to the present invention, which is a modification of the first preferred embodiment. Unlike the first preferred embodiment of FIG. 5, the transformer (112d, 122d, 132d) of each of the inverters (11d, 12d, 13d) has two secondary coils, each of which is coupled to the series connection of each of the lamp units (L1–L6) with a respective one of the loads (Z1–Z6) and a respective one of coils of the transformer (Td). Each of the inverters (11d, 12d, 13d) is adapted to convert the DC signal (Vi) into two AC current signals.

Figure 13:
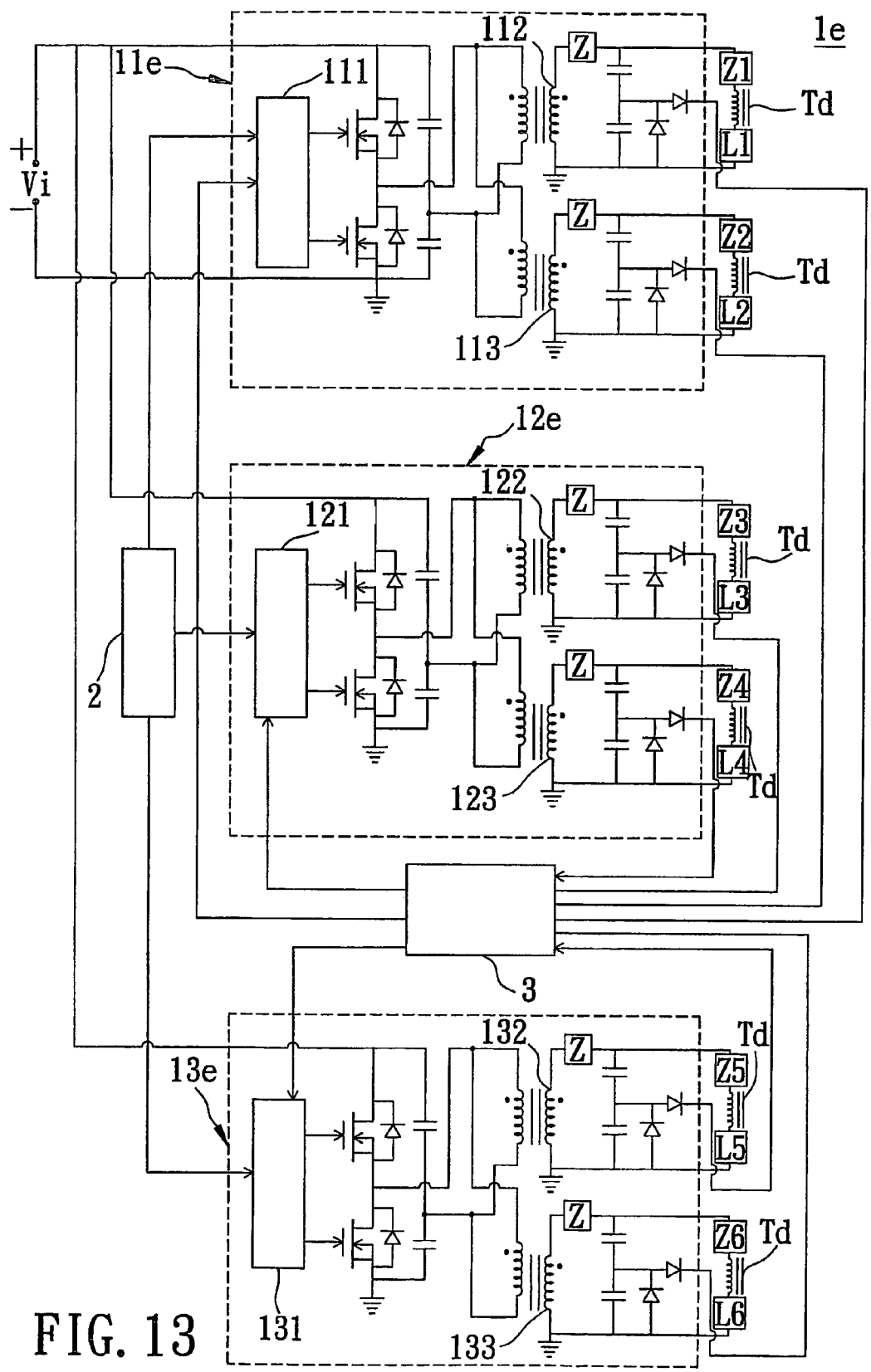
FIG. 13 is a schematic electrical circuit diagram illustrating the fifth preferred embodiment of a multi-lamp driving system according to the present invention.

FIG. 13 illustrates the fifth preferred embodiment of a multi-lamp driving system (1e) for driving a plurality of lamp units (L1–L6) according to the present invention, which is a modification of the first preferred embodiment. Unlike the fourth preferred embodiment of FIG. 12, each of the inverters (11e, 12e, 13e) has two single-phase transformers 112, 113, 122, 123, 132, 133, each of which has the same configuration as the transformers 112, 122, 132 in the first preferred embodiment of FIG. 5.

Figure 14:
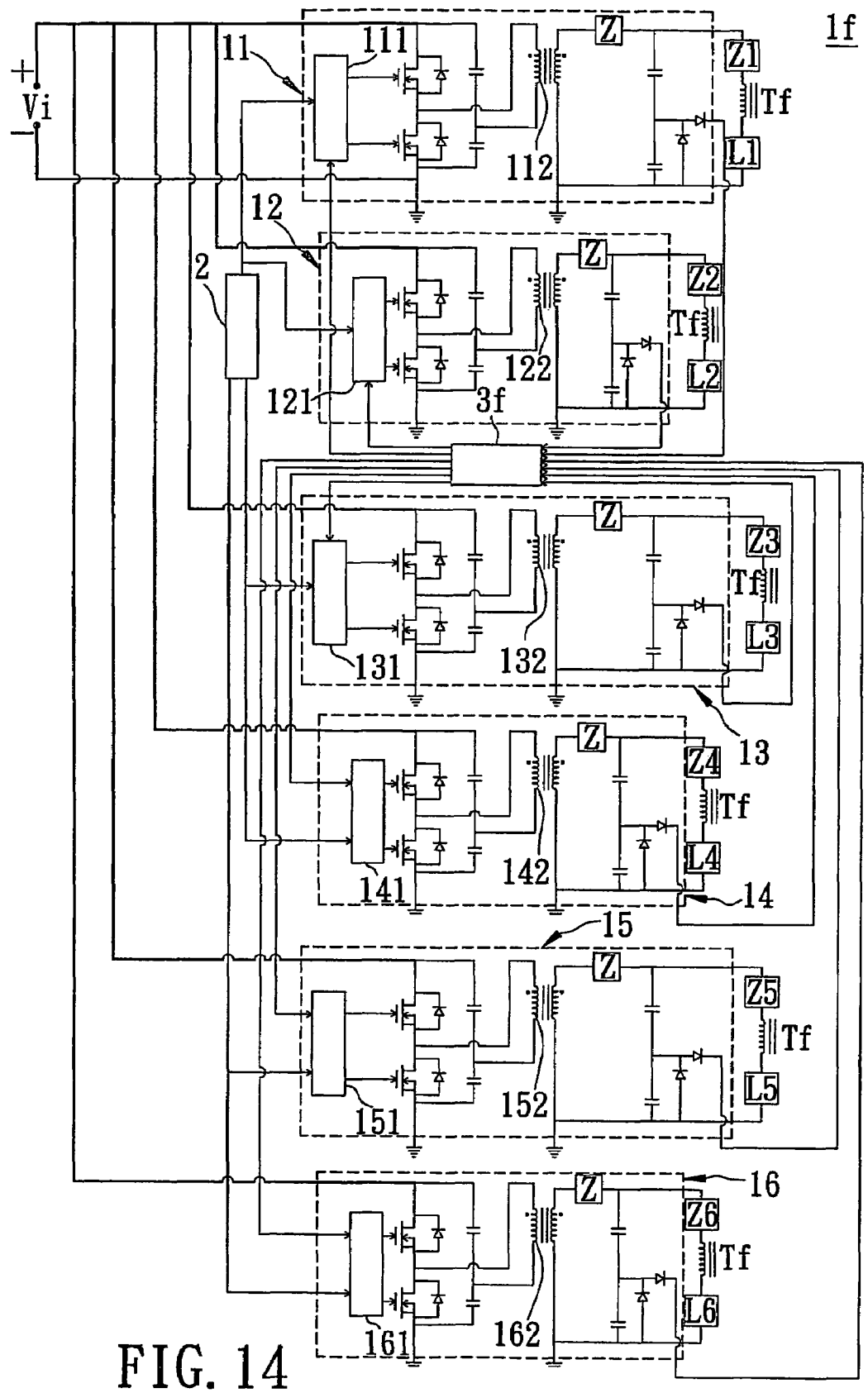
FIG. 14 is a schematic electrical circuit diagram illustrating the sixth preferred embodiment of a multi-lamp driving system according to the present invention.

FIG. 14 illustrates the sixth preferred embodiment of a multi-lamp driving system (1f) for driving a plurality of lamp units (L1–L6) according to the present invention, which is a modification of the first preferred embodiment. In this embodiment, the AC power generating unit includes six inverters 11–16, each of which has the same configuration as the inverters 11, 12, 13 in the first preferred embodiment of FIG. 5.

Figure 15:
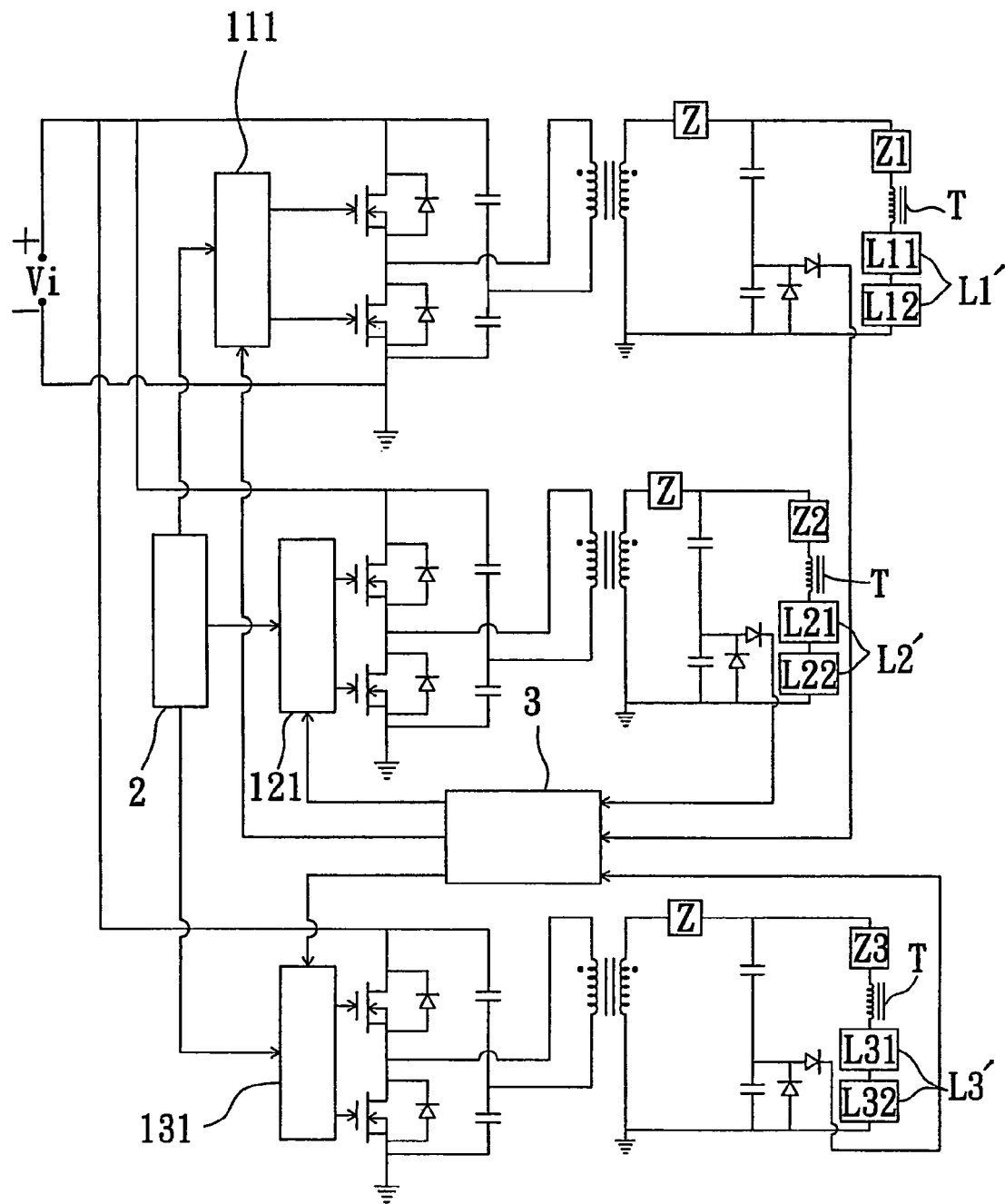
FIG. 15 is a schematic electrical circuit diagram illustrating a variation of the first preferred embodiment.

FIG. 15 illustrates a variation of the first preferred embodiment. In this embodiment, each of lamp units (L1', L2', L3') includes two lamps (L11, L12, L21, L22, L31, L32) directly connected in series.

Figure 16:
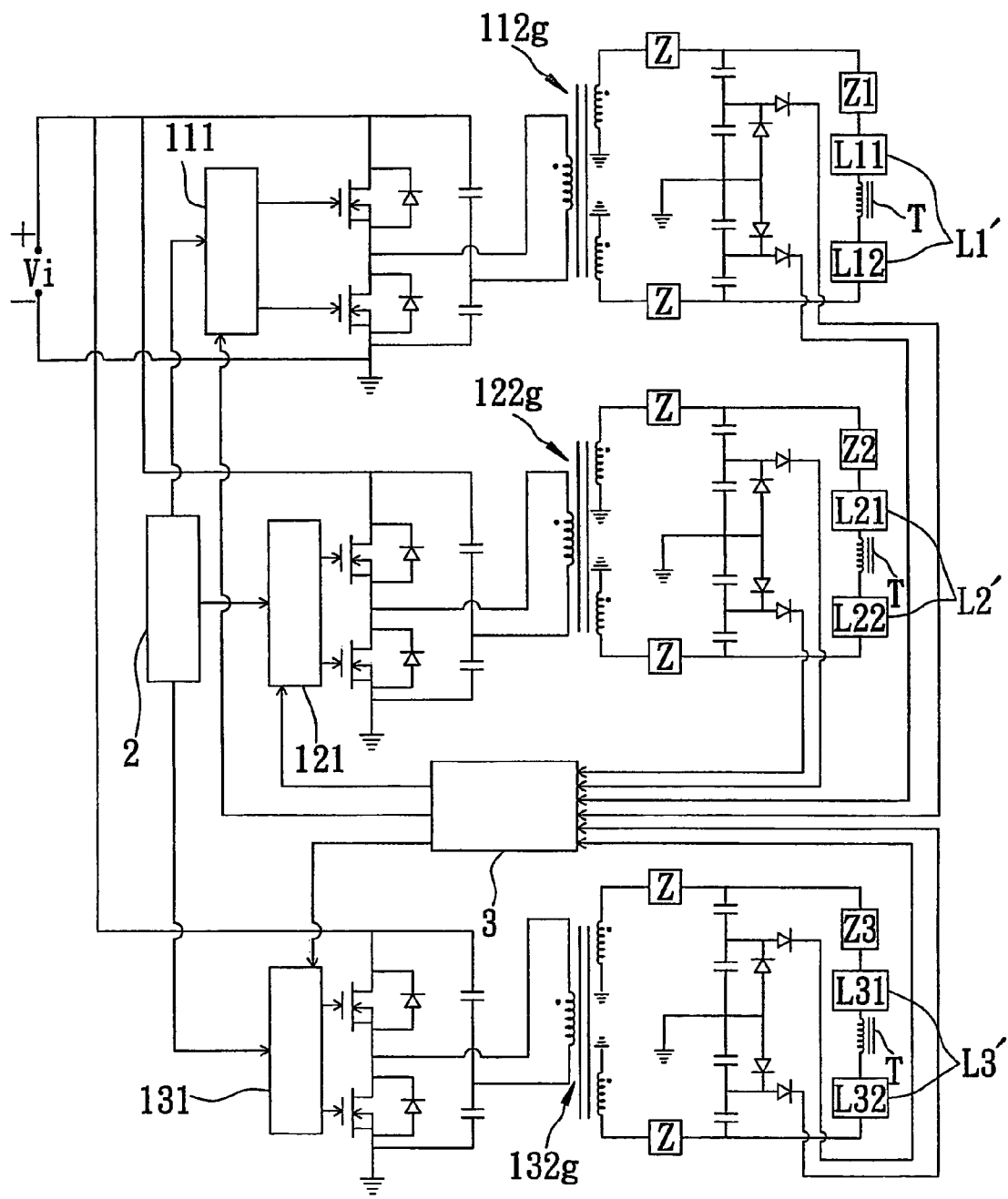
FIG. 16 is a schematic electrical circuit diagram illustrating the seventh preferred embodiment of a multi-lamp driving system according to the present invention.

FIG. 16 illustrates the seventh preferred embodiment of a multi-lamp driving system (1g) for driving a plurality of lamp units (L1'–L3') according to the present invention, which is a modification of the first preferred embodiment. Unlike the embodiment of FIG. 15, the lamp (L11) of the lamp unit (L1') is adapted to be connected between a load (Z1) and a respective coil, and the lamp (L12) of the lamp unit (L1') is adapted to be connected to the respective coil. Similarly, the lamp (L21) of the lamp unit (L2') is adapted to be connected between a load (Z2) and a respective coil, and the lamp (L22) of the lamp unit (L2') is adapted to be connected to the respective coil. The lamp (L31) of the lamp unit (L3') is adapted to be connected between a load (Z3) and a respective coil, and the lamp (L32) of the lamp unit (L3') is adapted to be connected to the respective coil. Each of the transformers (112g, 122g, 132g) has a primary coil, and two secondary coils that are coupled in series and across the series connection of a respective lamp unit (L1', L2', L3') with a respective one of the loads (Z1–Z3) and a respective coil.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A multi-lamp driving system for driving a plurality of lamp units, comprising:
    a multi-phase alternating current (AC) power generating unit for generating a plurality of out-of-phase AC current signals; and
    a balancing unit for balancing current flowing through each of the lamp units, said balancing unit including a plurality of loads, and a multi-phase transformer that has a plurality of coils, each of the lamp units being adapted to be connected to at least one of a respective one of said loads and a respective one of said coils, and forming a series connection with the respective one of said loads and the respective one of said coils,
    wherein the series connection of each of the lamp units with the respective one of said loads and the respective one of said coils is coupled across said AC power generating unit.

2. The multi-lamp driving system as claimed in claim 1, wherein said AC power generating unit includes:
    a plurality of inverters, each of which is adapted to convert an external direct-current (DC) signal into at least a respective one of the AC current signals, the series connection of each of the lamp units with the respective one of said loads and the respective one of said coils being coupled across a respective one of said inverters; and
    a phase shift controller connected electrically to said inverters for generating a number (P) of driving signals, each of said inverters outputting said at least the respective one of the AC current signals in response to a respective one of the driving signals.

3. The multi-lamp driving system as claimed in claim 2, wherein each of said inverters includes
    a driving circuit connected electrically to said phase shift controller for receiving the respective one of the driving signals therefrom and for converting the DC signal into the respective one of the AC current signals.

4. The multi-lamp driving system as claimed in claim 3, wherein each of said inverters further includes at least one single-phase transformer for adjusting the respective one of the AC current signals.

5. The multi-lamp driving system as claimed in claim 4, wherein said single-phase transformer has a primary coil coupled to said driving circuit, and at least one secondary coil coupled to the series connection of each of the lamp units with the respective one of said loads and the respective one of said coils.

6. The multi-lamp driving system as claimed in claim 2, wherein said power generating unit further includes a controller connected electrically to each of said inverters for generating a feedback pulse width modulation signal thereto so as to control the brightness of each of the lamp units.

7. The multi-lamp driving system as claimed in claim 2, wherein a phase difference between any two of the driving signals is an integer multiple of 360°/P.

8. The multi-lamp driving system as claimed in claim 1, wherein each of said loads is composed of at least one of resistors, capacitors, inductors, transistors, and integrated circuits.

9. The multi-lamp driving system as claimed in claim 1, wherein each of said coils of said multi-phase transformer is connected in series to a respective one of said loads and is adapted to be connected in series to a respective one of the lamp units.

10. The multi-lamp driving system as claimed in claim 1, wherein each of the lamp units is adapted to be connected between the respective one of said loads and the respective one of the coils of said multi-phase transformer.

11. The multi-lamp driving system as claimed in claim 1, wherein at least two of the series connections of each of the lamp units with the respective one of said loads and the respective one of said coils of said multi-phase transformer are connected in parallel.

* * * * *